(12) United States Patent
Krummel (10) Patent No.: US 8,986,811 B2
(45) Date of Patent: *Mar. 24, 2015

(54) ROTATIONALLY OFFSET PENETRATION RESISTANT ARTICLES

(71) Applicant: Joseph Edward Krummel, Rising Sun, MD (US)

(72) Inventor: Joseph Edward Krummel, Rising Sun, MD (US)

(73) Assignee: Barrday Inc., Cambridge (CA)

( * ) Notice: Subject to any disclaimer, the term of this patent is extended or adjusted under 35 U.S.C. 154(b) by 0 days.

This patent is subject to a terminal disclaimer.

(21) Appl. No.: 14/220,727

(22) Filed: Mar. 20, 2014

(65) Prior Publication Data

US 2014/0287183 A1    Sep. 25, 2014

Related U.S. Application Data

(63) Continuation of application No. 12/797,102, filed on Jun. 9, 2010, now Pat. No. 8,697,219.

(60) Provisional application No. 61/213,458, filed on Jun. 11, 2009.

(51) Int. Cl.
  *B32B 5/02*    (2006.01)
  *F41H 5/04*    (2006.01)
  *B32B 5/12*    (2006.01)
  (Continued)

(52) U.S. Cl.
  CPC ............... *F41H 5/0485* (2013.01); *B32B 5/12* (2013.01); *B32B 5/26* (2013.01); *B32B 27/02* (2013.01); *B32B 27/12* (2013.01); *B32B 27/34* (2013.01); *B32B 5/024* (2013.01); *B32B 37/0076* (2013.01); *B32B 38/1808* (2013.01);
  (Continued)

(58) Field of Classification Search
  CPC .... B29K 2223/0683; B32B 5/00; B32B 5/02; B32B 5/022; B32B 5/024; B32B 5/026; F41H 5/0471; F41H 5/0485
  USPC .......................................... 428/105, 98, 114
  See application file for complete search history.

(56) References Cited

U.S. PATENT DOCUMENTS

| 5,578,358 A | 11/1996 | Foy et al. |
| 5,926,842 A | 7/1999 | Price et al. |

(Continued)

FOREIGN PATENT DOCUMENTS

CA    2627901 A1    6/2007

OTHER PUBLICATIONS

International Preliminary Report on Patentability (IPRP) dated Dec. 12, 2011 for corresponding International Application No. PCT/CA2010/000870.

(Continued)

*Primary Examiner* — Brent O'Hern (57) ABSTRACT

A penetration-resistant article is provided comprising two or more layers of woven fabric. The layers of woven fabric each comprise a first series of fibers aligned in a first direction and a second series of fibers interwoven with the first series of fibers and aligned in a second direction perpendicular to the first direction. Two or more layers of woven fabric are loosely stacked together so as to permit relative slippage therebetween and are rotationally offset by an offset angle selected so as to inhibit mechanical interference between opposing adjacent surfaces of the woven fabric layers during slippage therebetween. Also provided are methods for assembling penetration-resistant articles.

18 Claims, 7 Drawing Sheets

(51) Int. Cl.
  *B32B 5/26* (2006.01)
  *B32B 27/02* (2006.01)
  *B32B 27/12* (2006.01)
  *B32B 27/34* (2006.01)
  *B32B 37/00* (2006.01)
  *B32B 38/18* (2006.01)

(52) U.S. Cl.
  CPC ........ *B32B 2305/18* (2013.01); *B32B 2309/06* (2013.01); *B32B 2571/00* (2013.01)
  USPC .............................. 428/105; 428/98; 428/114

(56) References Cited

U.S. PATENT DOCUMENTS

| | | | |
|---|---|---|---|
| 6,219,842 B1 | 4/2001 | Bachner, Jr. et al. | |
| 6,475,936 B1 | 11/2002 | Chiou | |
| 6,526,862 B1 * | 3/2003 | Lyons | 89/36.05 |
| 6,931,662 B2 | 8/2005 | Lindemulder | |
| 8,697,219 B2 * | 4/2014 | Krummel | 428/105 |
| 2003/0228815 A1 | 12/2003 | Bhatnagar et al. | |
| 2004/0048538 A1 | 3/2004 | Granqvist et al. | |
| 2008/0138566 A1 | 6/2008 | Stewart et al. | |

OTHER PUBLICATIONS

Written Opinion of the International Searching Authority dated Oct. 20, 2010 for corresponding International Application No. PCT/CA2010/000870.

International Search Report (ISR) dated Sep. 13, 2010 for corresponding International Application No. PCT/CA2010/000870.

English Translation of the KIPO Notice of Preliminary Rejection dated Sep. 25, 2013 for corresponding Korean Patent Application No. 10-2012-7000725.

* cited by examiner

FIG. 1

Model : PROPRIETARY LAYUP　　　　　　　　　　　　　　　　Via : HAND CARRIED
Size : 15X15　　　　Weight : NA　　　　　　　　　　Returned : HAND CARRIED
Construction :

SET-UP　　　　　　　　　　　　　　　　　　　　　　Test Personnel : A. WILLIAMSON
　Upper Drop Mass (g) : 1259　　D Time Base (mm) : 30.00　　Temperature (F) : 71
　Lower Drop Mass (g) : 652　　Standoff Distance (mm) : 12.7　　Rel. Humidity (%) : 64

| No. | Sample Description | Blade (P1, S1, Spike) | Angle (deg.) | Desired Energy | | Drop Height | | Time (ms) | Impact Energy (J) | Penet. (mm) | Remarks |
|---|---|---|---|---|---|---|---|---|---|---|---|
| | | | | Level | J | (ft.) | (in.) | | | | |
| 1 | 17 LAYERS | SPIKE | 0 | L2, E1 | 50 | 8 | 11.50 | 4.1597 | 50.21 | 0 | |
| 2 | 17 LAYERS | SPIKE | 0 | L2, E2 | 50 | 8 | 11.50 | 4.1587 | 50.23 | 0 | (a) |
| 3 | 16 LAYERS | SPIKE | 0 | L2, E2 | 50 | 8 | 11.50 | 4.1719 | 49.91 | 0 | |
| 4 | 16 LAYERS | SPIKE | 0 | L2, E2 | 50 | 8 | 11.50 | 4.1671 | 50.03 | 0 | |
| 5 | 14 LAYERS | SPIKE | 0 | L2, E2 | 50 | 8 | 11.50 | 4.1609 | 50.18 | 0 | |
| 6 | 14 LAYERS | SPIKE | 0 | L2, E2 | 50 | 8 | 11.50 | 4.1657 | 50.06 | 0 | |
| 7 | 13 LAYERS | SPIKE | 0 | L2, E2 | 50 | 8 | 11.50 | 4.1624 | 50.14 | 0 | |
| 8 | 12 LAYERS | SPIKE | 0 | L2, E2 | 50 | 8 | 11.50 | 4.1597 | 50.21 | 0 | |
| 9 | 12 LAYERS | SPIKE | 0 | L2, E2 | 50 | 8 | 11.50 | 4.1840 | 49.62 | 0 | (a) |
| 10 | 12 LAYERS | SPIKE | 0 | L2, E2 | 50 | 8 | 11.50 | 4.1625 | 50.14 | 0 | |
| 11 | 11 LAYERS | SPIKE | 0 | L2, E2 | 50 | 8 | 11.50 | 4.1682 | 50.00 | 0 | |
| 12 | 10 LAYERS | SPIKE | 0 | L2, E2 | 50 | 8 | 11.50 | 4.1659 | 50.06 | 33 | (b) |
| 13 | 11 LAYERS | SPIKE | 0 | L2, E2 | 50 | 8 | 11.50 | 4.1703 | 49.95 | 0 | |
| 14 | 10 LAYERS | SPIKE | 0 | L2, E2 | 50 | 8 | 11.50 | 4.1537 | 50.35 | 36 | |
| 15 | 10 LAYERS | SPIKE | 0 | L2, E2 | 50 | 8 | 11.50 | 4.1526 | 50.38 | 53 | |
| 16 | 11 LAYERS | SPIKE | 0 | L2, E2 | 50 | 8 | 11.50 | 4.1607 | 50.18 | 26 | |
| 17 | 11 LAYERS | SPIKE | 0 | L2, E2 | 50 | 8 | 11.50 | 4.1619 | 50.15 | 0 | |
| 18 | 11 LAYERS | SPIKE | 0 | L2, E2 | 50 | 8 | 11.50 | 4.1762 | 49.81 | 0 | |
| 19 | 10 LAYERS | SPIKE | 0 | L2, E2 | 50 | 8 | 11.50 | 4.1641 | 50.10 | 0 | |
| 20 | 10 LAYERS | SPIKE | 0 | L2, E2 | 50 | 8 | 11.50 | 4.1641 | 50.10 | 0 | |
| 21 | 9 LAYERS | SPIKE | 0 | L2, E2 | 50 | 8 | 11.50 | 4.1596 | 50.21 | 50 | |
| 22 | | | | | | | | | | | |
| 23 | | | | | | | | | | | |
| 24 | | | | | | | | | | | |
| 25 | | | | | | | | | | | |
| 26 | | | | | | | | | | | |
| 27 | | | | | | | | | | | |
| 29 | | | | | | | | | | | |
| 30 | | | | | | | | | | | |

NOTES
(a) SPIKE BENT
(b) CHANGED DISCS

DEFINITIONS
Per NIJ-STD-0115.00, sample fails if E1 penetration > 7mm or E2 penetration > 20mm
Upper Drop Mass includes weight of 2 foam disks; Lower Drop Mass includes weight of test implement
D Time Base is distance between velocity sensors
Standoff Distance is measured from blade tip to armor surface when drop mass is at 0 position
　(just breaking bottom velocity sensor beam)

FIG. 2

Model : CONTROL NORMAL LAYUP  
Size : 15X15    Weight : NA  
Construction :

Via : HAND CARRIED  
Returned : HAND CARRIED

SET-UP  
Upper Drop Mass (g) : 1259  
Lower Drop Mass (g) : 652  
D Time Base (mm) : 30.0  
Standoff Distance (mm) : 12.7  
Test Personnel : A. WILLIAMSON  
Temperature (F) : 71  
Rel. Humidity (%): 64

| No. | Sample Description | Blade (P1, S1, Spike) | Angle (deg.) | Desired Energy | | | Drop Height | | Time (ms) | Impact Energy (J) | Penet. (mm) | Remarks |
|---|---|---|---|---|---|---|---|---|---|---|---|---|
| | | | | Level | J | | (ft.) | (in.) | | | | |
| 1 | 14 LAYERS CONTROL | SPIKE | 0 | L2, E1 | 50 | | 8 | 11.50 | 4.1558 | 50.30 | 32 | (a,b) |
| 2 | 14 LAYERS CONTROL | SPIKE | 0 | L2, E2 | 50 | | 8 | 11.50 | 4.1616 | 50.16 | 33 | |
| 3 | 15 LAYERS CONTROL | SPIKE | 0 | L2, E2 | 50 | | 8 | 11.50 | 4.1738 | 49.87 | 29 | |
| 4 | 17 LAYERS CONTROL | SPIKE | 0 | L2, E2 | 50 | | 8 | 11.50 | 4.1718 | 49.92 | 23 | |
| 5 | 17 LAYERS CONTROL | SPIKE | 0 | L2, E2 | 50 | | 8 | 11.50 | 4.1633 | 50.12 | 0 | |
| 6 | 16 LAYERS CONTROL | SPIKE | 0 | L2, E2 | 50 | | 8 | 11.50 | 4.1678 | 50.01 | 0 | |
| 7 | 16 LAYERS CONTROL | SPIKE | 0 | L2, E2 | 50 | | 8 | 11.50 | 4.1678 | 50.01 | 0 | |
| 8 | 15 LAYERS CONTROL | SPIKE | 0 | L2, E2 | 50 | | 8 | 11.50 | 4.1502 | 50.44 | 0 | (a) |
| 9 | 14 LAYERS CONTROL | SPIKE | 0 | L2, E2 | 50 | | 8 | 11.50 | 4.1495 | 49.45 | 0 | |
| 10 | 16 LAYERS CONTROL | SPIKE | 0 | L2, E2 | 50 | | 8 | 11.50 | 4.1639 | 50.10 | 0 | |
| 11 | 13 LAYERS CONTROL | SPIKE | 0 | L2, E2 | 50 | | 8 | 11.50 | 4.1628 | 50.13 | 23 | (b) |
| 12 | 14 LAYERS CONTROL | SPIKE | 0 | L2, E2 | 50 | | 8 | 11.50 | 4.1464 | 50.53 | 31 | |
| 13 | 15 LAYERS CONTROL | SPIKE | 0 | L2, E2 | 50 | | 8 | 11.50 | 4.1777 | 49.77 | 29 | |
| 14 | 16 LAYERS CONTROL | SPIKE | 0 | L2, E2 | 50 | | 8 | 11.50 | 4.1458 | 50.54 | 1 | (a) |
| 15 | 16 LAYERS CONTROL | SPIKE | 0 | L2, E2 | 50 | | 8 | 11.50 | 4.1519 | 50.39 | 24 | |
| 16 | 16 LAYERS CONTROL | SPIKE | 0 | L2, E2 | 50 | | 8 | 11.50 | 4.1592 | 50.22 | 22 | |
| 17 | 16 LAYERS CONTROL | SPIKE | 0 | L2, E2 | 50 | | 8 | 11.50 | 4.1559 | 50.30 | 0 | (d) |
| 18 | 16 LAYERS CONTROL | SPIKE | 0 | L2, E2 | 50 | | 8 | 11.50 | 4.1575 | 50.26 | 0 | |
| 19 | | | | | | | | | | | | |
| 20 | | | | | | | | | | | | |
| 21 | | | | | | | | | | | | |
| 22 | | | | | | | | | | | | |
| 23 | | | | | | | | | | | | |
| 24 | | | | | | | | | | | | |
| 25 | | | | | | | | | | | | |
| 26 | | | | | | | | | | | | |
| 27 | | | | | | | | | | | | |
| 28 | | | | | | | | | | | | |
| 29 | | | | | | | | | | | | |
| 30 | | | | | | | | | | | | |

NOTES  
(a) SPIKE BENT  
(b) CHANGED FOAM BACKING  
(c) CHANGED DISCS

DEFINITIONS  
Per NIJ-STD-0115.00, sample fails if E1 penetration > 7mm or E2 penetration > 20mm  
Upper Drop Mass includes weight of 2 foam disks; Lower Drop Mass includes weight of test implement  
D Time Base is distance between velocity sensors  
Standoff Distance is measured from blade tip to armor surface when drop mass is at 0 position  
  (just breaking bottom velocity sensor beam)

FIG. 3

Model : BARRDAY 4590, 1024-1202  Via : HAND CARRIED
Size : VEST    Weight : UNKNOWN  Returned : HAND CARRIED
Construction : PROPRIETARY SET-UP                                                        Test Personnel : B. SHAFFER
Upper Drop Mass (g) : 1259    D Time Base (mm) : 30.0    Temperature (F) : 66
Lower Drop Mass (g) : 652     Standoff Distance (mm) : 12.7    Rel. Humidity (%): 48

| No. | Sample Description | Blade (P1, S1, Spike) | Angle (deg.) | Desired Energy | | Drop Height | | Time (ms) | Impact Energy (J) | Penet. (mm) | Remarks |
|---|---|---|---|---|---|---|---|---|---|---|---|
| | | | | Level | J | (ft.) | (in.) | | | | |
| 1 | SAMPLE #3 | SPIKE | 0 | L1, E2 | 36 | 6 | 5.00 | 4.9304 | 35.88 | 0 | 8 LAYERS + FELT |
| 2 | SAMPLE #3 | SPIKE | 0 | L1, E2 | 36 | 6 | 5.00 | 4.9123 | 36.15 | 0 | 8 LAYERS + FELT |
| 3 | SAMPLE #3 | SPIKE | 0 | L1, E2 | 36 | 6 | 5.00 | 4.9191 | 36.05 | 0 | 8 LAYERS + FELT |
| 4 | SAMPLE #3 | SPIKE | 0 | L1, E2 | 36 | 6 | 5.00 | 4.9375 | 35.78 | 0 | 7 LAYERS + FELT |
| 5 | SAMPLE #3 | SPIKE | 0 | L1, E2 | 36 | 6 | 5.00 | 4.9238 | 35.98 | 0 | 7 LAYERS + FELT |
| 6 | SAMPLE #3 | SPIKE | 0 | L1, E2 | 36 | 6 | 5.00 | 4.9344 | 35.82 | 0 | 6 LAYERS + FELT |
| 7 | SAMPLE #3 | SPIKE | 0 | L1, E2 | 36 | 6 | 5.00 | 4.9325 | 35.85 | 0 | 6 LAYERS + FELT |
| 8 | SAMPLE #3 | SPIKE | 0 | L1, E2 | 36 | 6 | 5.00 | 4.9200 | 36.03 | 37 | 5 LAYERS + FELT |
| 9 | | | | | | | | | | | |
| 10 | | | | | | | | | | | |
| 11 | | | | | | | | | | | |
| 12 | | | | | | | | | | | |
| 13 | | | | | | | | | | | |
| 14 | | | | | | | | | | | |
| 15 | | | | | | | | | | | |
| 16 | | | | | | | | | | | |
| 17 | | | | | | | | | | | |
| 18 | | | | | | | | | | | |
| 19 | | | | | | | | | | | |
| 20 | | | | | | | | | | | |
| 21 | | | | | | | | | | | |
| 22 | | | | | | | | | | | |
| 23 | | | | | | | | | | | |
| 24 | | | | | | | | | | | |
| 25 | | | | | | | | | | | |
| 26 | | | | | | | | | | | |
| 27 | | | | | | | | | | | |
| 28 | | | | | | | | | | | |
| 29 | | | | | | | | | | | |
| 30 | | | | | | | | | | | |
| NOTES | | | | | | | | | | | |

DEFINITIONS
Per NIJ-STD-0115.00, sample fails if E1 penetration > 7mm or E2 penetration > 20mm
Upper Drop Mass includes weight of 2 foam disks; Lower Drop Mass includes weight of test implement
D Time Base is distance between velocity sensors
Standoff Distance is measured from blade tip to armor surface when drop mass is at 0 position
  (just breaking bottom velocity sensor beam)

FIG. 4

Model : BARRDAY 4590, 1024-1202  
Size : VEST     Weight : UNKNOWN  
Construction : PROPRIETARY Via : HAND CARRIED  
Returned : HAND CARRIED SET-UP  
   Upper Drop Mass (g) : 1259     D Time Base(mm) : 30.0  
   Lower Drop Mass (g) : 652     Standoff Distance (mm) : 12.7

Test Personnel : B. SHAFFER  
Temperature (F) : 66  
Rel. Humidity (%): 48

| No. | Sample Description | Blade (P1, S1, Spike) | Angle (deg.) | Desired Energy | | Drop Height | | Time (ms) | Impact Energy (J) | Penet. (mm) | Remarks |
|---|---|---|---|---|---|---|---|---|---|---|---|
| | | | | Level | J | (ft.) | (in.) | | | | |
| 1 | SAMPLE #5 | SPIKE | 0 | L3, E2 | 65 | 11 | 8.00 | 3.6614 | 64.65 | 0 | 18 LAYERS + FELT |
| 2 | SAMPLE #5 | SPIKE | 0 | L3, E2 | 65 | 11 | 8.00 | 3.6332 | 65.66 | 0 | 17 LAYERS + FELT |
| 3 | SAMPLE #5 | SPIKE | 0 | L3, E2 | 65 | 11 | 8.00 | 3.6498 | 65.06 | 0 | 17 LAYERS + FELT |
| 4 | SAMPLE #5 | SPIKE | 0 | L3, E2 | 65 | 11 | 8.00 | 3.6515 | 65.00 | 0 | 16 LAYERS + FELT |
| 5 | SAMPLE #5 | SPIKE | 0 | L3, E2 | 65 | 11 | 8.00 | 3.6494 | 65.08 | 0 | 15 LAYERS + FELT |
| 6 | SAMPLE #5 | SPIKE | 0 | L3, E2 | 65 | 11 | 8.00 | 3.6570 | 64.80 | 0 | 15 LAYERS + FELT |
| 7 | SAMPLE #5 | SPIKE | 0 | L3, E2 | 65 | 11 | 8.00 | 3.6500 | 65.05 | 0 | 15 LAYERS + FELT |
| 8 | | | | | | | | | | | |
| 9 | | | | | | | | | | | |
| 10 | | | | | | | | | | | |
| 11 | | | | | | | | | | | |
| 12 | | | | | | | | | | | |
| 13 | | | | | | | | | | | |
| 14 | | | | | | | | | | | |
| 15 | | | | | | | | | | | |
| 16 | | | | | | | | | | | |
| 17 | | | | | | | | | | | |
| 18 | | | | | | | | | | | |
| 19 | | | | | | | | | | | |
| 20 | | | | | | | | | | | |
| 21 | | | | | | | | | | | |
| 22 | | | | | | | | | | | |
| 23 | | | | | | | | | | | |
| 24 | | | | | | | | | | | |
| 25 | | | | | | | | | | | |
| 26 | | | | | | | | | | | |
| 27 | | | | | | | | | | | |
| 28 | | | | | | | | | | | |
| 29 | | | | | | | | | | | |
| 30 | | | | | | | | | | | |
| NOTES | | | | | | | | | | | |

DEFINITIONS  
Per NIJ-STD-0115.00, sample fails if E1 penetration > 7mm or E2 penetration > 20mm  
Upper Drop Mass includes weight of 2 foam disks; Lower Drop Mass includes weight of test implement  
D Time Base is distance between velocity sensors  
Standoff Distance is measured from blade tip to armor surface when drop mass is at 0 position  
  (just breaking bottom velocity sensor beam)

FIG. 5

Model : BARRDAY 4590, 1024-1202  
Size : VEST  Weight : UNKNOWN  
Construction : PROPRIETARY Via : HAND CARRIED  
Returned : HAND CARRIED SET-UP  
Upper Drop Mass (g) : 1259  
Lower Drop Mass (g) : 652  
D Time Base(mm) : 30.0  
Standoff Distance (mm) : 12.7  
Test Personnel : B. SHAFFER  
Temperature (F) : 66  
Rel. Humidity (%): 48

| No. | Samle Description | Blade (P1, S1, Spike) | Angle (deg.) | Desired Energy Level | Desired Energy J | Drop Height (ft.) | Drop Height (in.) | Time (ms) | Impact Energy (J) | Penet. (mm) | Remarks |
|---|---|---|---|---|---|---|---|---|---|---|---|
| 1 | SAMPLE #2 | SPIKE | 0 | L2, E2 | 50 | 8 | 11.50 | 4.1634 | 50.12 | 0 | 15 LAYERS + FELT |
| 2 | SAMPLE #2 | SPIKE | 0 | L2, E2 | 50 | 8 | 11.50 | 4.1847 | 49.61 | 0 | 15 LAYERS + FELT |
| 3 | SAMPLE #2 | SPIKE | 0 | L2, E2 | 50 | 8 | 11.50 | 4.1667 | 50.04 | 0 | 15 LAYERS + FELT |
| 4 | SAMPLE #2 | SPIKE | 0 | L2, E2 | 50 | 8 | 11.50 | 4.1742 | 49.86 | 0 | 15 LAYERS + FELT |
| 5 | SAMPLE #2 | SPIKE | 0 | L2, E2 | 50 | 8 | 11.50 | 4.1642 | 50.10 | 0 | 14 LAYERS + FELT |
| 6 | SAMPLE #2 | SPIKE | 0 | L2, E2 | 50 | 8 | 11.50 | 4.1700 | 49.96 | 0 | 14 LAYERS + FELT |
| 7 | SAMPLE #2 | SPIKE | 0 | L2, E2 | 50 | 8 | 11.50 | 4.1652 | 50.07 | 0 | 13 LAYERS + FELT |
| 8 | SAMPLE #2 | SPIKE | 0 | L2, E2 | 50 | 8 | 11.50 | 4.1716 | 49.92 | 0 | 13 LAYERS + FELT |
| 9 | SAMPLE #2 | SPIKE | 0 | L2, E2 | 50 | 8 | 11.50 | 4.1796 | 49.73 | 0 | 13 LAYERS + FELT |
| 10 | | | | | | | | | | | |
| 11 | | | | | | | | | | | |
| 12 | | | | | | | | | | | |
| 13 | | | | | | | | | | | |
| 14 | | | | | | | | | | | |
| 15 | | | | | | | | | | | |
| 16 | | | | | | | | | | | |
| 17 | | | | | | | | | | | |
| 18 | | | | | | | | | | | |
| 19 | | | | | | | | | | | |
| 20 | | | | | | | | | | | |
| 21 | | | | | | | | | | | |
| 22 | | | | | | | | | | | |
| 23 | | | | | | | | | | | |
| 24 | | | | | | | | | | | |
| 25 | | | | | | | | | | | |
| 26 | | | | | | | | | | | |
| 27 | | | | | | | | | | | |
| 28 | | | | | | | | | | | |
| 29 | | | | | | | | | | | |
| 30 | | | | | | | | | | | |

NOTES

DEFINITIONS  
Per NIJ-STD-0115.00, sample fails if E1 penetration > 7mm or E2 penetration > 20mm  
Upper Drop Mass includes weight of 2 foam disks; Lower Drop Mass includes weight of test implement  
D Time Base is distance between velocity sensors  
Standoff Distance is measured from blade tip to armor surface when drop mass is at 0 position  
   (just breaking bottom velocity sensor beam)

ROTATIONALLY OFFSET PENETRATION RESISTANT ARTICLES

CROSS REFERENCE TO RELATED APPLICATIONS

This application is a Continuation of application Ser. No. 12/797,102, filed Jun. 9, 2010 (now issued U.S. Pat. No. 8,697,219), which claims the benefit of U.S. Provisional Application No. 61/213,458, filed on Jun. 11, 2009 and entitled ROTATIONALLY OFFSET PENETRATION RESISTANT MATERIALS, the entire contents of both applications are hereby incorporated herein by reference.

TECHNICAL FIELD OF THE INVENTION

The embodiments disclosed herein relate to penetration-resistant articles, and in particular to multi-layer penetration-resistant articles with woven layers.

BRIEF DESCRIPTION OF THE RELATED ART

There is currently a demand for improved penetration-resistant articles. Traditionally, some articles or armor systems designed for stab and/or spike-resistance have used composite systems that include metallic components in the form of rigid plates or platelets, such as chain mail.

More recently, penetration-resistant articles that use multiple layers of woven fabric have also been developed. For example, Foy and Miner (U.S. Pat. No. 5,578,358) describe an aramid article having improved resistance to penetration by sharp implements made of multiple layers of tightly woven fabric with a minimum fabric tightness factor wherein adjacent layers of the fabric are free to move relative to each other. Chiou (U.S. Pat. No. 6,475,936) describes matrix-resin free fabrics with a loose weave or low fabric tightness factor that also exhibit resistance to penetration by knife stabs. Granqvist et al. (US Publication No. 20040048538) describe a penetration resistant article consisting of one or more layers of a woven fabric having a friction raising means operating between the fabric layers.

There is a need for improved penetration-resistant articles and armor systems.

SUMMARY

Some embodiments described herein relate generally to penetration-resistant articles comprising multiple layers of woven fabric wherein adjacent layers fabric are rotationally offset.

The inventor has surprisingly found that rotationally offsetting the direction of warp or weft in adjacent layers of woven fabric tends to improve the penetration-resistance performance of multi-layer woven articles. This arrangement is believed to improve the slippage between adjacent layers of woven fabric in the article and lead to a corresponding increase in the resistance of the article to a stab or spike.

Accordingly, in one aspect there is provided a penetration-resistant article comprising a first layer of woven fabric and a second layer of woven fabric adjacent the first layer of woven fabric. In one embodiment, the first and second layers of woven fabric each comprise a first series of fibers aligned in a first direction and a second series of fibers interwoven with the first series of fibers and aligned in a second direction perpendicular to the first direction. In one embodiment, the first and second layers of woven fabric are loosely stacked together so as to permit relative slippage between the layers.

In one embodiment, the first and second directions of the fibers in the first layer of woven fabric are rotationally offset to the first and second directions of the fibers in the second layer of woven fabric by an offset angle. The offset angle may be selected so as to inhibit mechanical interference between opposing adjacent surfaces of the first and second woven fabric layers during slippage therebetween.

In one embodiment, the offset angle is selected so as to improve the relative slippage between adjacent layers of woven fabric. The offset angle between adjacent fabric layers may be about 45 degrees, about between 5 degrees and 45 degrees, or about between 30 degrees and 45 degrees.

In one embodiment, the penetration-resistant article further comprises additional layers of woven fabric. The additional layers of woven fabric may be rotationally offset and loosely stacked so as to permit relative slippage between the layers of woven fabric. The offset angles between adjacent layers may be about the same or they may be different.

In one embodiment, the penetration-resistant article comprises between 3 and 25 layers of woven fabric or greater than 25 layers of woven fabric. The woven fabric may be a plain-woven fabric made from high performance fibers such as aramid fibers.

In one embodiment, the articles described herein meet or exceed Level 1, Level 2 and/or Level 3 National Institute of Justice (NIJ) standard 0115.00 for stab resistance of personal body armor.

In one embodiment, the fabric layers are loosely stacked together so as to permit relative slippage between the layers. The fabric layers may be combined to maintain a selected offset angle between adjacent layers of woven fabric. In one embodiment, the layers of woven fabric are combined to as to maintain the relative rotational offset of adjacent fabric layers. The layers may be combined in a bag or envelope that surrounds the layers of woven fabric and maintains the relative rotational offset of the fabric layers. In one embodiment, the layers of woven fabric are combined so as to permit slippage of adjacent fabric layers. The layers of woven fabric may be combined by attaching the layers at one or more spots along the perimeter of the fabric or at one or more spots on the surface of the fabric. In one embodiment, a substantial portion of the opposing surfaces of adjacent fabric layers are not mechanically coupled. In one embodiment, greater than 50%, 70%, 80%, 90%, 95% or 99% of the opposing surfaces of adjacent fabric layers are not mechanically coupled.

In one aspect, there is provided a method of assembling a penetration-resistant article as described herein. In one embodiment, two or more layers of woven fabric are provided wherein each layer of woven fabric comprise a first series of fibers aligned in a first direction and a second series of fibers interwoven with the first series of fibers and aligned in a second direction perpendicular to the first direction. The woven fabric may be a plain-woven fabric. In one embodiment the method includes selecting an offset angle between adjacent layers of woven fabric so as to inhibit mechanical interference between opposing adjacent surfaces of layers of woven fabric. The layers of fabric may be oriented such that adjacent layers of woven fabric are rotationally offset by the selected offset angle. The fabric layers may be stacked and the rotational offset of each layer oriented to the selected offset angle in the stack.

In one embodiment, the method comprises combining the layers of woven fabric so as to permit slippage between adjacent layers of woven fabric. In one embodiment, the method comprises combining the layers of woven fabric so as to maintain the rotational offset of adjacent fabric layers.

Other aspects and features of the present specification will become apparent to those ordinarily skilled in the art upon review of the following description.

BRIEF DESCRIPTION OF THE DRAWINGS

The drawings included herewith are for illustrating various examples of articles, methods, and apparatuses of the present specification and are not intended to limit the scope of what is taught in any way. In the drawings:

FIG. 2 provides the results of NIJ-STD-0115.0 spike testing for a rotationally offset layup (90/45/90) of 70×70 200 denier Kevlar® Correctional™ fabric;

FIG. 3 provides the results of NIJ-STD-0115.0 spike testing for a control layup (90/90/90) of 70×70 200 denier Kevlar® Correctional™ fabric;

FIG. 6 provides the results of Level 2 NIJ-STD-0115.0 spike testing for 13 to 15 layers of a rotationally offset layup (90/45/90) of 70×70 200 denier Kevlar® Correctional™ fabric;

DETAILED DESCRIPTION

Exemplary embodiments described herein include penetration-resistant articles made with multiple layers of woven fabric, with one or more adjacent layers of fabric being rotationally offset.

The inventor has surprisingly discovered that the penetration-resistance performance of multi-layer woven articles tends to improve if adjacent layers are positioned such that the direction of fibers or yarns in adjacent layers is rotationally offset.

As used herein, the term "penetration-resistance" refers to the ability of an article to resist penetration when forcibly contacted or stabbed with a sharpened object. In one embodiment, the object is a spike. In some embodiments, the object is a blade, ice pick, awl, shank, or any similar pointed implement. In some embodiments the object may be a sharpened or pointed piece of plastic or an improvised object such as a pen or shiv. The penetration-resistance of an article can be measured according National Institute of Justice (NIJ) standard 0115.00 (Available from the National Law Enforcement and Corrections Technology Center, P.O. Box 1160, Rockville Md., 20849-1160).

As used herein, the term "fiber" refers to an elongated body for which the length dimension is greater than the transverse or width dimension. In some embodiments, a series of fibers aligned in the same general longitudinal direction may constitute a yarn or tape.

In some embodiments, the fibers are high-performance fibers such as aramid fibers, extended chain polyethylene fibers, and/or poly(p-phenylene-2,6-benzobisoxazole) (PBO) fibers. Other examples could include aramid and copolymer aramid fibers, for example as produced commercially by DuPont (Kevlar®), Teijin (Twaron®), Kolon (Heracron®), and Hyosung Aramid, modified para-aramids (e.g. Rusar®, Autex®), ultra high molecular weight polyethylene (UHMWPE) produced commercially by Honeywell, DSM, and Mitsui under the trade names Spectra®, Dyneema®, and Tekmilon®, respectively (as well as Pegasus® yarn), polyethylene fibers and films produced by Synthetic Industries and sold under the trade name Tensylon®, poly(p-phenylene-2,6-benzobisoxa-zole) (PBO) (produced by Toyobo under the commercial name Zylon®), and/or polyester-polyarylate yarns (e.g. Liquid crystal polymers produced by Kuraray under the trade name Vectran®). In some embodiments, the fibers are Innegra™ fibers produced by Innegrity™ LLC.

According to some embodiments, the penetration-resistant articles described herein include fibers that are arranged into a woven fabric. As used herein, the term "woven fabric" refers to a plurality of fibers that have been interwoven so as to form a generally continuous sheet. In one embodiment, the woven fabric comprises a plurality of interwoven warp and weft yarns as generally known in the art.

It will be understood that in some embodiments a particular fabric may be made from a single type of fiber, or from two or more various types of fibers. Each fabric may also include various types of fibers in each yarn and/or in different yarns that may be combined to make the fabric.

In some embodiments, the fabric may be woven on standard weaving looms, including rapier, shuttle, air jet and water jet looms. Woven fabrics useful for the penetration-resistant articles described herein may include weaves such as a plain weaves, crowfoot weaves, basket weaves, satin weaves, twill weaves, proprietary weaves, or the like.

In one embodiment, the woven fabric comprises a first series of fibers aligned in a first direction and a second series of fibers interwoven with the first series of fibers and aligned in a second direction. In one embodiment, the direction of the first series of fibers is perpendicular to direction of the second series of fibers in the plane of the woven fabric. Optionally, the woven fabric comprises warp yarns and weft yarns, wherein the warp yarns comprise a first series of fibers and the weft yarns comprise a second series of fibers. In one embodiment, the woven fabric has a series of fibers that are generally parallel in a first direction, interwoven with a series of fibers that are generally parallel in a second direction perpendicular to the fibers in the first direction. In one embodiment, each layer of woven fabric defines a perpendicular set of axes with a first series of fibers in one direction and a second series of fibers in a generally perpendicular direction. This perpendicular set of axes in a first layer of woven fabric can therefore be aligned or rotationally offset with a set of axes defined by the direction of the fibers or yarns in an adjacent layer of woven fabric.

As used herein, two woven fabric layers are "rotationally offset" if the direction of a series of fibers in a first fabric layer forms an angle in the plane of the fabric other than about 0 degrees or 90 degrees with the direction of a series of fibers in a second adjacent fabric layer. In contrast, two woven fabric layers are considered "aligned" if the direction of the fibers in one fabric layer is collinear or parallel with the direction of fibers in the second fabric layer.

As used herein "offset angle" refers to the smallest angle formed in the plane of the fabric between the direction of a series of fibers in the first fabric layer and a direction formed by a series of fibers in the second adjacent fabric layer. For example, a series of fibers defining a direction or axis in a first fabric layer will form two angles in the plane of the fabric that measure less than 90 degrees with a perpendicular set of axes defined by the direction of the fibers in a second fabric layer.

In one embodiment, the "offset angle" therefore refers to an angle of less than or equal to about 45 degrees.

In one embodiment, the fabric is woven in a tight weave. While the embodiments described herein are not limited to any particular fabric tightness, tighter fabric weaves are generally preferred for penetration-resistant articles since they tend to provide better resistance to penetration of spikes and/or blades through the layers of fabric.

In one embodiment, the fabric is a tight, plainly woven 70×70, 200 denier Kevlar®. Optionally, the fabric may be made from yarn that includes high-performance fibers and has a yarn denier of between 1 and 750. In some embodiments, the woven fabric may be made from yarn having a denier between 150 and 250. In one embodiment, the fabric is 200 denier Kevlar® Correctional™ available from E.I. du Pont de Nemours and Company.

The penetration-resistant articles as generally described herein comprise multiple layers of woven fabric. In some embodiments, the articles comprise at least two layers of fabric. In some embodiments, the articles comprise three or more layers of fabric. In some embodiments the articles comprise between 5 and 25 layers of fabric, or greater than 25 layers of fabric. In other embodiments the articles comprise between 6 and 17 layers of fabric.

The number of layers in a particular article may be selected according to the desired level of threat protection, and it is generally understood that a greater number of fabric layers generally provides greater protection as compared to a smaller number of fabric layers.

In some embodiments, the article comprises 6 or more layers of 200 denier Kevlar woven fabric and meets or exceeds the Level 1 National Institute of Justice's (NIJ) Standard STD-0115.00 with respect to stab testing. In another embodiment, the article comprises 13 or more layers of 200 denier Kevlar woven fabric and meets or exceeds Level 2 NIJ STD-0115.00. In another embodiment, the article comprises 15 or more layers of 200 denier Kevlar woven fabric and meets or exceeds Level 3 NIJ STD-0115.00.

The penetration-resistant articles described herein include multiple layers of woven fabric, wherein at least some of the adjacent layers are rotationally offset. As shown in Examples 1 and 2, rotationally offsetting adjacent layers of woven fabric surprisingly tends to improve the spike-resistance performance of multi-layer woven articles when tested to NIJ Standard 0115.00 Level 2. This improved performance resulted in a 34% relative reduction in fabric layers as compared to a conventionally arranged sample article for the same level of protection (see FIG. 2).

Without limiting the scope of the embodiments described herein, the inventor believes that rotationally offsetting the individual protection layers tends to inhibit the fibers in adjacent layers from interlocking or mechanically engaging with each other. This tends to promote slippage between adjacent fabric layers and may cause movement of the penetration threat upon impact (e.g. lateral and/or rotational movement of the spike or stabbing item), thereby allowing fewer layers of fabric to stop the threat. This is in contrast to ballistic-resistant articles, which commonly use materials where fabric layers are held together either by stitching or by using composite materials to hold the fabric layers in position and to prevent slippage between the fabric layers.

Figure 1:
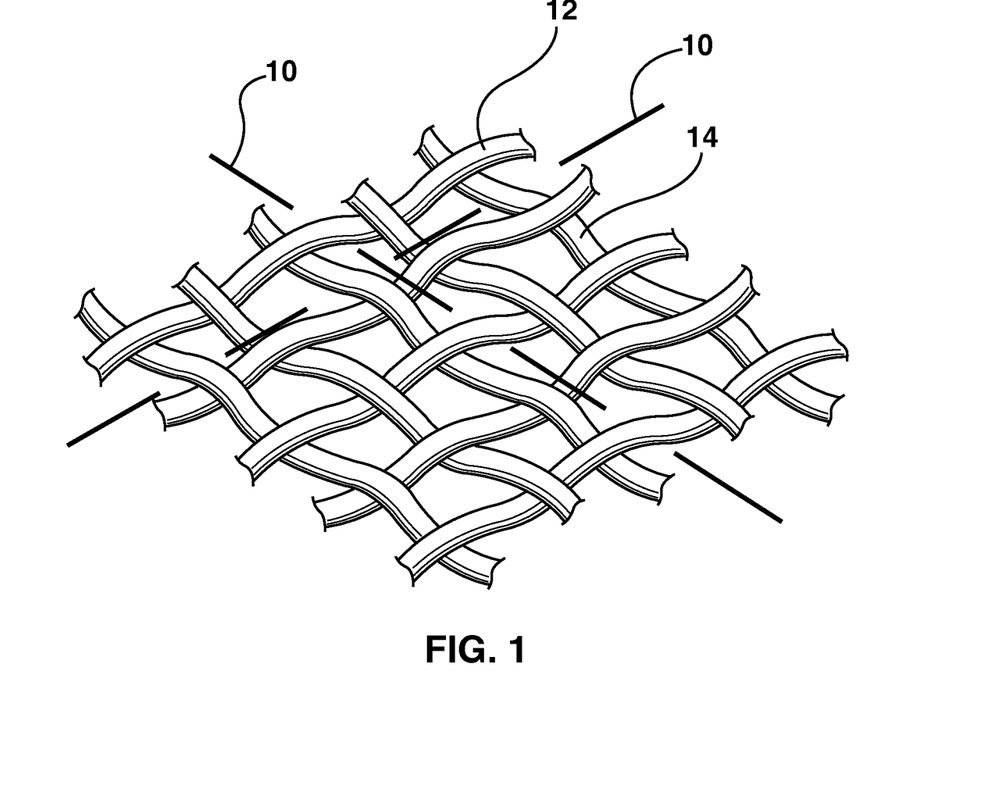
FIG. 1 is a schematic showing ridge-like features in a woven fabric according to one embodiment.

Generally, the surface of a layer of woven fabric includes intermittent ridge-like features defined by the fibers or warp or weft yarns as shown in FIG. 1. Referring to FIG. 1, a series of ridge-like surface features (10) indicated by the dashed lines are formed by the warp (12) or weft (14) yarns or fibers on the surface of the fabric. When adjacent layers of fabric in a multi-layer article are positioned such that the ridge-like surface features are aligned, movement of the fabric layers can result in contact and locking or nesting of the ridge-like surface features between one layer within the ridge-like surface features on the surface of another adjacent layer, and this tends to prevent or impair the relative movement or slippage of adjacent fabric layers.

However, the inventor believes that by rotationally offsetting the warp yarns and/or weft yarns in adjacent layers of woven fabric, the contact or mechanical interference between the ridge-like structures in adjacent layers is reduced as the ridges are no longer parallel and tend not to mechanically engage or nest with each other. As used herein "mechanical interference" refers to the interaction of surface features on opposing adjacent surfaces of woven fabric layers during the slippage of one layer of woven fabric against another layer of woven fabric. As used herein "slippage" refers to the relative movement of at least a portion of one fabric along the surface of an adjacent fabric.

In one aspect adjacent fabric layers are therefore arranged to minimize or at least reduce the contact between the surface features. In some embodiments, adjacent layers of fabric are rotationally offset such that the ridge-like surface features are not parallel. In some embodiments the direction of a series of fibers in one fabric layer is rotationally offset at an angle substantially different than the direction a series of fibers in an adjacent layer.

In one aspect, there is provided a penetration-resistant article wherein layers of adjacent woven fabric are rotationally offset by an offset angle selected so as to inhibit mechanical interference between the opposing adjacent surfaces of the woven fabric layers during slippage therebetween. In one embodiment, the offset angle is about 45 degrees. In one embodiment, the offset angle is greater than 0 degrees and less than or equal to 45 degrees. Optionally, the offset angle is between about 5 degrees and 45 degrees or between about 30 and 45 degrees. A person skilled in the art will be able to select a suitable offset angle based on the teachings of the present disclosure and the characteristics of the woven fabrics used to form the penetration-resistant article. In one embodiment, the offset angle is selected to minimize mechanical interference between the opposing adjacent surfaces of the woven fabric layers.

Figure 7:
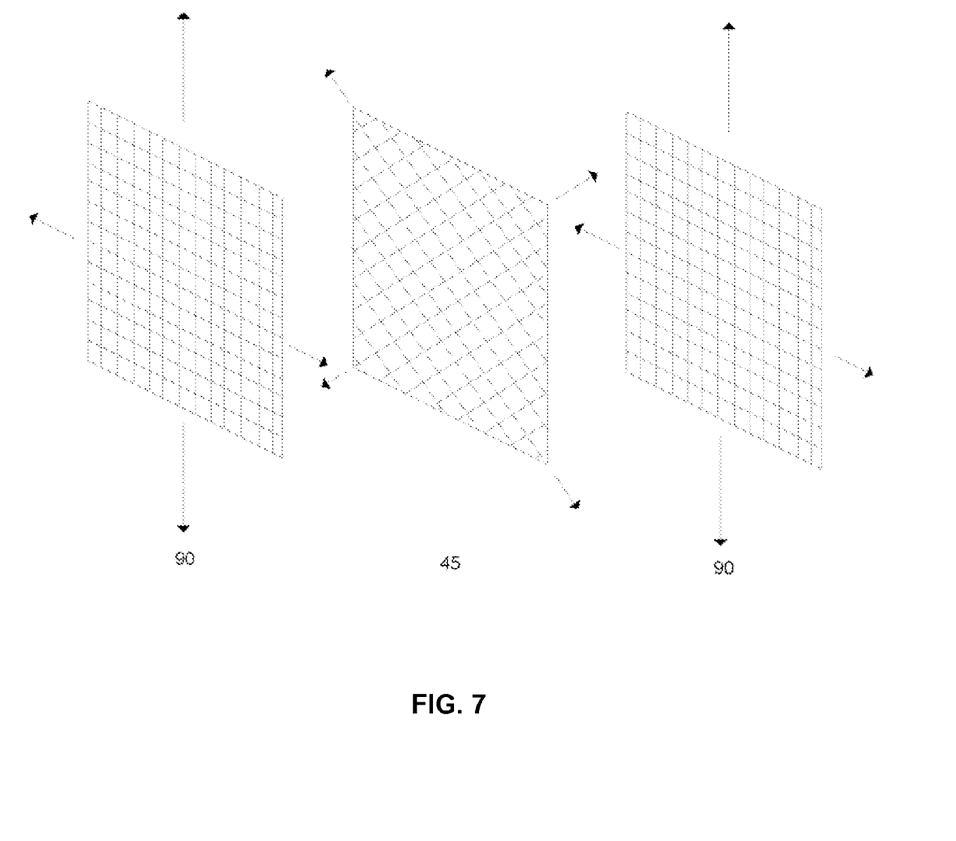
FIG. 7 is an exploded view of three layers of adjacent woven fabric arranged with a 45 degree rotational offset (90/45/90) according to one embodiment.

In one aspect there is provided a penetration-resistant article with 3 or more fabric layers wherein adjacent layers are each rotationally offset at 45 degrees. FIG. 7 provides a schematic showing three layers of fabric wherein adjacent layers are rotationally offset at 45 degrees. Assuming the warp in the first layer is oriented at vertically at 90 degrees, the adjacent layers that are rotationally offset at 45 degrees are therefore arranged in a 90/45/90 orientation as shown in FIG. 7. Some additional embodiments include penetration-resistant articles with between 5 and 50 layers of fabric wherein some or all of the adjacent layers are rotationally offset at an angle of about 45 degrees. A person skilled in the art will appreciate an article comprising layers of plain woven fabric with identical warp and weft arranged in a 90/90/90 orientation (i.e. warp yarns or fibers vertically aligned in adjacent layers) will be identical to an article arranged in a 90/0/90 orientation (i.e. warp and weft yarns or fibers aligned in adjacent layers).

In some embodiments, the articles may have different rotational offsets between adjacent layers. Generally, in some embodiments any combination of rotational offsets may be used with the fibers or warp or weft yarns in adjacent layers being rotationally offset and not aligned. For example, in one embodiment a penetration-resistant article may have 7 or more layers arranged such that the adjacent layers each have an offset angle of 15 degrees (i.e. 90/75/60/45/30/15/90) to promote slippage between the layers. In some embodiments, adjacent layers are offset at different degrees of rotation.

In other embodiments, one or more adjacent orthogonal layers may be combined with one or more rotationally offset layers. For example, a five-layer fabric may have a 90/0/90/45/90 configuration.

In one aspect, woven fabric layers are combined to form a penetration-resistant article and to permit the slippage of at least some of the fabric layers. In another aspect, woven fabric layers are combined to form a penetration-resistant article where the relative rotational offset of adjacent woven fabric layers is generally maintained. In one embodiment, the impact of a stab or spike will cause the fabric layers to slip relative to one another.

In one embodiment, the layers of woven fabric are loosely stacked together so as to permit the relative slippage of the fabric layers. As used herein "loosely stacked together" refers to the arrangement of two or more layers of woven fabric in a stack wherein a substantial portion of opposite adjacent surfaces are not mechanically coupled. Loosely stacking the woven fabric layers allows a fabric layer to move or slip relative to an adjacent layers upon impact of a threat such as a spike or sharpened implement, thereby increasing the penetration resistance of the article. In one embodiment, the layers of woven fabric are loosely stacked together to generally maintain the rotational offset of the adjacent woven fabric layers. In one embodiment, the plurality of woven fabric layers are combined to permit the slippage of at least some of the fabric layers and to maintain the relative orientation of the fabric layers with respect to the rotational offset of the fabric layers.

For example, in one embodiment the fabric layers are combined by fastening the layers at one or more spots along the perimeter of the fabric. The fabric layers may be combined by an interlayer connection at some relatively great spacing compared to the thickness of the article. In one embodiment, the fabric layers are combined by using an adhesive, thermal adhesive, stitching or any other method know for combining layers of fabric known in the art. In one embodiment, the fabric layers are not mechanically coupled. For example, the fabric layers may be combined by enclosing the fabric layers in a bag, vest, or other suitable container or envelope that allows slippage between the fabric layers but maintains the rotational offset between adjacent layers in the stack of woven fabric layers. In one embodiment, the fabric layers may be combined by fastening and/or enclosing the fabric layers in a bag, vest, or other suitable container or envelope.

In some embodiments, the penetration-resistant articles described herein may be used in armor systems. The penetration-resistant articles described herein may also be combined with other materials such as ceramics and/or metals suitable for penetration-resistant product designs for spikes and/or edged weapons that are known in the art.

In some cases, the embodiments described herein may be combined with ballistic-resistant materials in order to create a multi-threat resistant armor system.

Finished articles or armor systems that may make use of the penetration-resistant articles described herein include, but are not limited to, body armor, personal armor plates and shields, stab and spike resistant vests or shields, and stab and spike resistant clothing (e.g. pants, shirts, etc.) as well as garments or articles that are abrasion resistant, slash cut resistant, and/or shock resistant.

In another aspect, there is provided methods for assembling the penetration-resistant articles as described herein. In one embodiment, two or more layers of woven fabric are provided to assemble into a penetration resistant article and an offset angle is selected to inhibit mechanical interference between opposing adjacent surfaces of the provided woven fabric layers. The fabric layers may then be stacked and each layer oriented at the selected offset angle. In one embodiment, the fabric layers are then combined to allow for slippage between the layers.

In one aspect, the method comprises selecting an offset angle to minimize mechanical interference between opposing adjacent surfaces. In one embodiment, method comprises selecting an offset angle of about 45 degrees. In one embodiment, the offset angle is selected to be about between 5 degrees and 45 degrees. In one embodiment the offset angle is selected to be about between 30 and 45 degrees.

In one embodiment, the method includes providing 3 or more woven fabric layers to assemble into a penetration-resistant article. In one embodiment the method comprises selecting offset angles between adjacent fabric layers that are the same. In another embodiment, the method comprises selecting offset angles between adjacent fabric layers that are different.

In one aspect, the method includes combining the woven fabric layers to form the penetration-resistant article. In one embodiment, the layers are combined to as to allow slippage between adjacent layers of woven fabric. In one embodiment, the woven fabric layers are combined to maintain the selected offset angle between adjacent layers of woven fabric.

In one embodiment, the method comprises combining layers of woven fabric by inserting the first and second layers into a bag or envelope that surrounds the first and second layers of woven fabric. In one embodiment, the bag or envelope is made of fabric and inserting the fabric layers into the bag or envelope restrains the relative movement of the fabric layers contained therein.

In one embodiment, the method comprises attaching adjacent layers of woven fabric. In one embodiment, method comprises attaching adjacent layers of woven fabric such that substantial portions of opposing adjacent surfaces of the fabric layers are not mechanically coupled. For example, in one embodiment the method comprises attaching the layers at one or more spots along the surface or perimeter of the fabric.

The above disclosure generally describes some embodiments of the present application. Further details may be obtained by reference to the following specific examples. These examples are described solely for the purpose of illustration and are not intended to limit the scope of the disclosure. In particular, changes in form and substitution of equivalents are contemplated as circumstances might suggest or render expedient. Although specific terms have been employed herein, such terms are intended in a descriptive sense and not for purposes of limitation.

EXAMPLES

Example 1

Comparison Testing of Rotationally-Offset 200 Denier Kevlar™

Two series of armor systems were tested according to Level 2 NIJ-STD-0115.00 by H.P. White Laboratory Inc. in order to observe the effects of rotationally offsetting adjacent layers of woven fabric on stab resistance. Both series used identical fabric layers of 200 denier plain weave 70×70 Kevlar® Correctional™. Referring to FIG. 2, the "Proprietary Layup" consisted of layers of fabric wherein adjacent layers were arranged in a 90/45/90 degree rotational offset. Referring to FIG. 3, the "Control Normal Layup" consisted of adjacent layers of fabric that were positioned in a traditional 90/90/90 degree arrangement such that warp or weft in adjacent layers was parallel.

As shown in FIG. 2, test samples with a 90/45/90 degree rotational offset failed at 9 layers (1/1 samples), 10 layers (3/5 samples) and at 11 layers (1/5 samples) when tested to NIJ-STD-0115.00 standards with a spike. No penetration was observed in rotationally offset 200 denier Kevlar® Correctional™ test samples that consisted of 12 or more layers.

FIG. 3 shows that test samples positioned in a 90/90/90 arrangement offset failed at 17 layers (1/2 samples), 16 layers (2/8 samples), 15 layers (2/3 samples; bent spike), 14 layers (3/4 samples) and at 13 layers (1/1 samples).

Test samples arranged with a 90/45/90 degree rotational offset therefore tended to exhibit better performance and resist penetration at lower layer counts when compared to conventional fabric samples without the rotational offset.

Example 2

S-50 Value of Rotationally-Offset 200 Denier Kevlar®

Table 1 summarizes the results presented in FIGS. 2 and 3 of the comparative testing of rotationally offset 200 denier Kevlar® Correctional™ fabric. An S-50 value, which represents that average number of layers at which penetration will occur 50% of the time using a NIJ-STD-0115.00 spike at Level 2/Energy 2 (approx. 50 Joules), was calculated for each group of samples. As shown in Table 1, the S-50 value for the 90/90/90 Control Sample was 15.7 while the S-50 value for the rotationally offset 90/45/90 Test Sample was 10.36. This difference in S-50 level represents a fabric layer reduction of 33.99% for an equivalent level of spike protection.

TABLE 1

Comparative testing of and calculation of S-50 levels for 200 denier Kevlar ® Correctional ™.

| Control Sample: 90/90/90 Layup | | | Test Sample: 45/90/45/90 Layup | | |
|---|---|---|---|---|---|
| Number of Layers | Result | Penetration (mm) | Number of Layers | Result | Penetration (mm) |
| 17 | C | 23 | 17 | P | 0 |
| 17 | P | 0 | 17 | P | 0 |
| 16 | P | 0 | 16 | P | 0 |
| 16 | P | 0 | 16 | P | 0 |
| 16 | P | 0 | 14 | P | 0 |
| 16 | C | 1 | 14 | P | 0 |
| 16 | C | 24 | 13 | P | 0 |
| 16 | C | 22 | 12 | P | 0 |
| 16 | P | 0 | 12 | P | 0 |
| 16 | P | 0 | 12 | P | 0 |
| 15 | C | 29 | 11 | P | 0 |
| 15 | P | 0 | 10 | C | 33 |
| 15 | C | 29 | 11 | P | 0 |
| 14 | C | 33 | 10 | C | 36 |
| 14 | C | 32 | 10 | C | 50 |
| 14 | P | 0 | 11 | C | 26 |
| 14 | C | 31 | 11 | P | 0 |
| 13 | C | 23 | 11 | P | 0 |
| 15.7 | | S-50 | 10 | P | 0 |
| | | | 10 | P | 0 |
| | | | 9 | C | 50 |
| | | | 10.36 | | S-50 |
| FABRIC LAYER REDUCTION: | | | 33.99% | | |

P = partial penetration;
C = complete penetration.

Example 3

Rotationally Offset Kevlar® Armor Systems Consistently Meet or Exceed NIJ-STD-0115.00 Standards In order to further investigate the performance of the armor systems described herein, additional testing of articles comprising multiple layers of 200 denier Kevlar® Correctional™ fabric rotationally offset at 90/45/90 degrees was performed according to NIJ-STD-0115.00 standards.

Figure 4:
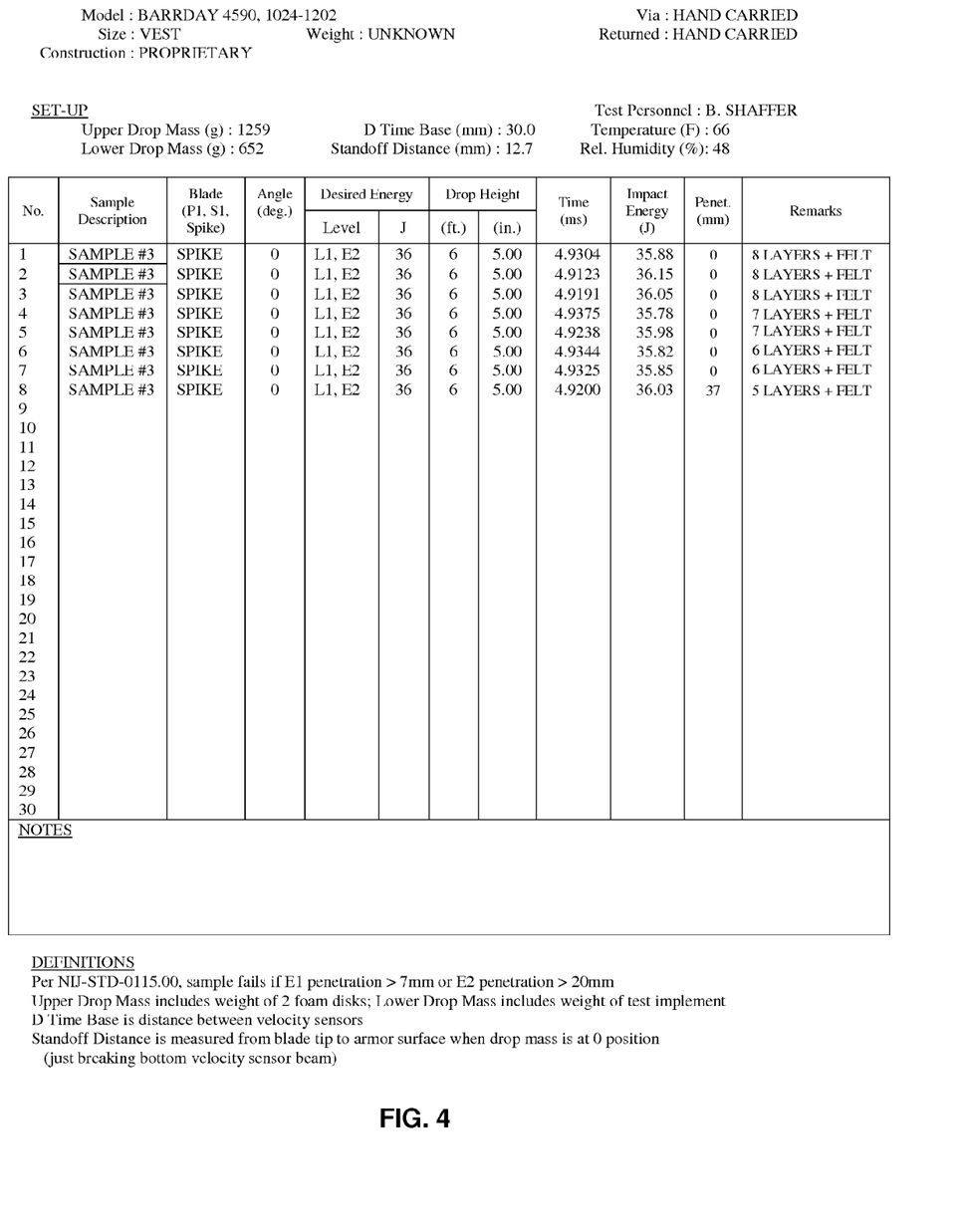
FIG. 4 provides the results of Level 1 NIJ-STD-0115.0 spike testing for 5 to 8 layers of a rotationally offset layup (90/45/90) of 70×70 200 denier Kevlar® Correctional™ fabric.

Results shown in FIG. 4 indicates that articles made from 6 or more layers of 200 denier Kevlar® rotationally offset at 45 degrees are compliant with Level 1 NIJ-STD-0115.00.

Figure 5:
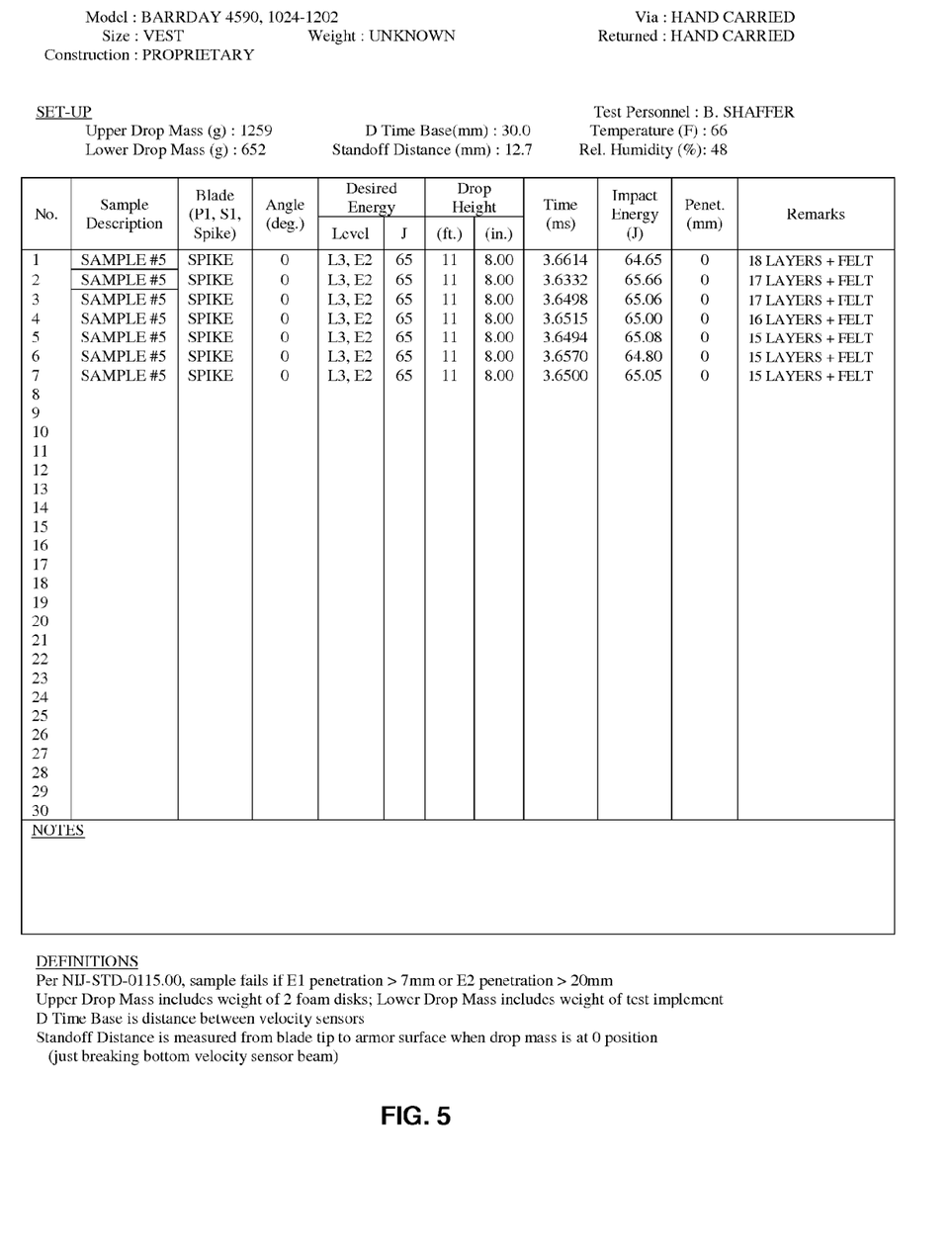
FIG. 5 provides the results of Level 3 NIJ-STD-0115.0 spike testing for 15 to 18 layers of a rotationally offset layup (90/45/90) of 70×70 200 denier Kevlar® Correctional™ fabric.

Results shown in FIG. 5 indicate that articles made from 15 layers or more of 200 denier Kevlar® rotationally offset at 45 degrees are compliant with Level 3 NIJ-STD-0115.00.

Results shown in FIG. 6 indicated that articles made from 13 layers or more of 200 denier Kevlar® rotationally offset at 45 degrees are compliant to Level 2 NIJ-STD-0115.00.

While the above description provides examples of one or more penetration-resistant articles, armor systems and/or methods of assembly, it will be appreciated that other articles, armor systems and/or methods of assembly may be within the scope of the present description as interpreted by one of skill in the art.

I claim:

1. A penetration-resistant article comprising:
a first layer of woven fabric;
a second layer of woven fabric adjacent the first layer of woven fabric;
the first and second layers of woven fabric each comprising a first series of fibers aligned in a first direction and a second series of fibers interwoven with the first series of fibers and aligned in a second direction perpendicular to the first direction;
the first and second layers of woven fabric loosely stacked together so as to permit relative slippage therebetween;
wherein the first and second directions of the fibers in the first layer of woven fabric are rotationally offset to the first and second directions in the second layer of woven fabric by an offset angle selected so as to inhibit mechanical interference between opposing adjacent surfaces of the first and second woven fabric layers during slippage therebetween,
wherein the first and second layers of woven fabric are combined in a bag or envelope that surrounds the first and second layers of woven fabric and maintains the relative rotational offset of the stacked fabric layers, and
wherein the penetration-resistant article is resistant to penetration by a sharpened object and meets or exceeds Level 1 National Institute of Justice (NIJ) standard 0115.00 for stab resistance of personal body armor.

2. The penetration-resistant article of claim 1, wherein the offset angle is about 45 degrees.

3. The penetration-resistant article of claim 1, wherein the offset angle is about between 5 and 45 degrees.

4. The penetration-resistant article of claim 1, wherein the offset angle is about between 30 and 45 degrees.

5. The penetration-resistant article of claim 1, wherein the offset angle is selected so as to improve the relative slippage between adjacent layers of woven fabric.

6. The penetration-resistant article of claim 1, further comprising a third layer of woven fabric loosely stacked on the second layer so as to permit relative slippage between the second layer and third layer.

7. The penetration-resistant article of claim 6, wherein the first and second directions of the fibers in the third layer are rotationally offset to the first and second directions of the fibers in the second layer of woven fabric by a second offset angle selected so as to inhibit mechanical interference between opposing adjacent surfaces of the second and third woven fabric layers during slippage therebetween.

8. The penetration-resistant article of claim 7, wherein the first and second offset angle are different.

9. The penetration-resistant article of claim 7, wherein the first and second offset angle are about the same.

10. The penetration-resistant article of claim 7, further comprising a fourth layer of woven fabric loosely stacked on the third layer so as to permit relative slippage between the third layer and fourth layer, and wherein the first and second directions of the fibers in the fourth layer are rotationally offset to the first and second directions of the fibers in the third layer of woven fabric by a third offset angle selected so as to inhibit mechanical interference between opposing adjacent surfaces of the third and fourth woven fabric layers during slippage therebetween.

11. The penetration-resistant article of claim 1, wherein the article comprises between 3 and 25 layers of woven fabric and at least some of the layers of woven fabric are loosely stacked and rotationally offset so as to inhibit mechanical interference between opposing adjacent surfaces of the woven fabric layers during slippage therebetween.

12. The penetration-resistant article of claim 1, wherein the woven fabric is a plain-woven fabric.

13. The penetration-resistant article of claim 1, wherein the fibers are aramid fibers.

14. The penetration-resistant article of claim 1, wherein the article meets or exceeds Level 2 and/or Level 3, National Institute of Justice (NIJ) standard 0115.00 for stab resistance of personal body armor.

15. The penetration-resistant article of claim 1, wherein the first and second layers of woven fabric are combined by attaching the layers of woven fabric at one or more spots along the perimeter of the fabric.

16. The penetration-resistant article of claim 1, wherein the layers of woven fabric are not stitched together.

17. The penetration-resistant article of claim 1, wherein greater than 50% of the opposing surfaces of the first and second layers of woven fabric are not mechanically coupled.

18. The penetration-resistant article of claim 1, wherein greater than 90% of the opposing surfaces of the first and second layers of woven fabric are not mechanically coupled.

* * * * *